Patented Jan. 16, 1945

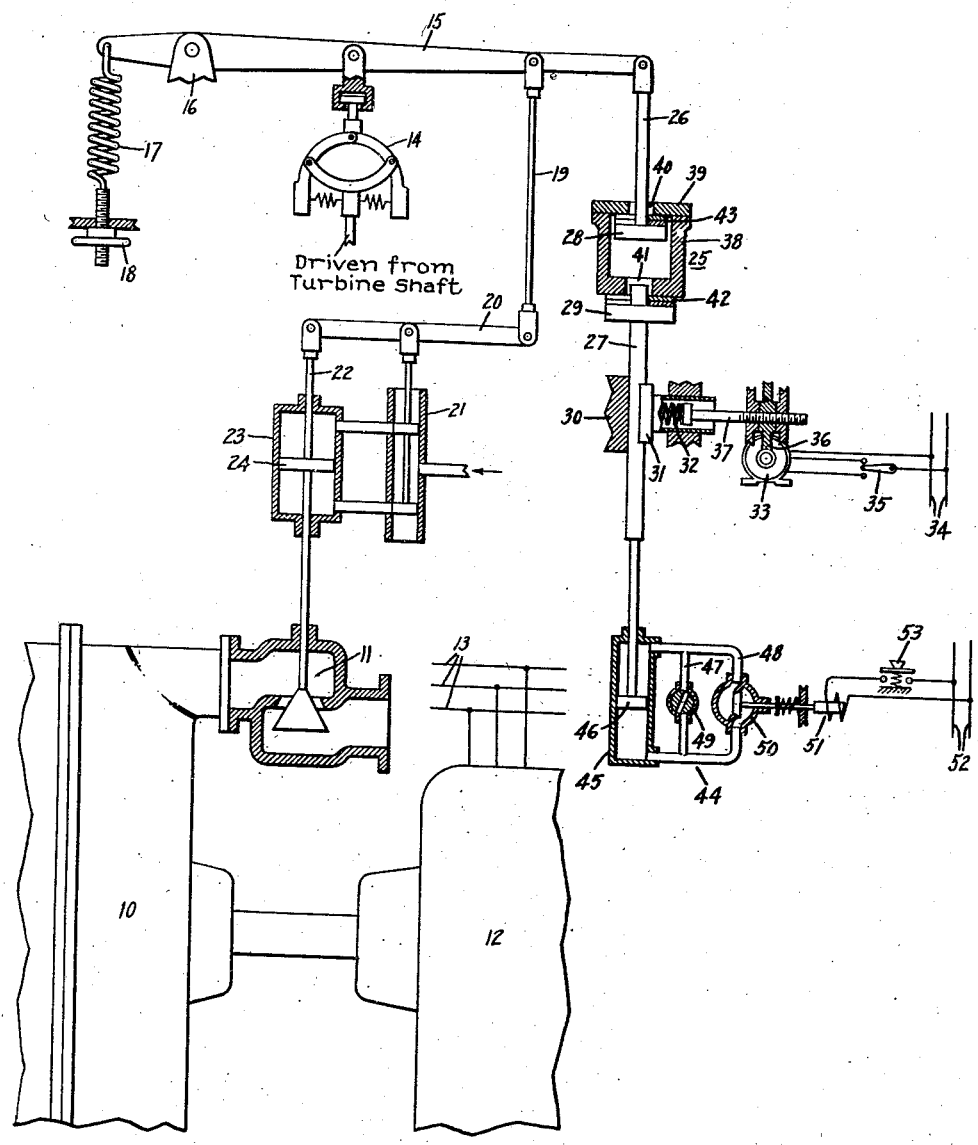

2,367,209

UNITED STATES PATENT OFFICE 2,367,209

GOVERNING MECHANISM

Linn A. Gore, Schenectady, N. Y., assignor to General Electric Company, a corporation of New York Application November 26, 1942, Serial No. 466,999½

3 Claims. (Cl. 172—284)

The present invention relates to governing mechanisms for controlling the flow of operating medium to a prime mover. More specifically the invention relates to mechanisms which include means for maintaining the load of a prime mover constant as long as its speed or the frequency of a generator driven by it remains within certain limits. With such arrangement a 10,000 kw. turbo generator, for example, may be controlled to furnish a constant output of 5,000 kw. as long as the turbine speed remains within one per cent of its normal operating speed. If a greater speed change occurs the load limiting device is automatically rendered ineffective or inoperative and the turbine is permitted to take on or throw off load. In arrangements of this kind it is desirable to vary the load setting of the prime mover. A governing mechanism with a load-setting and load-limiting device is disclosed in the copending application of Frank G. Philo, Serial No. 446,566, filed June 11, 1942, and assigned to the same assignee as the present application.

The general object of my invention is to provide an improved construction and arrangement of governing mechanisms and load-limiting and load-setting devices whereby the load of a prime mover may be readily set and maintained constant within a predetermined range of speed change or like operating condition of the prime mover or within a predetermined range of frequency change of a generator driven thereby.

This is accomplished in accordance with my invention by the provision of a governing mechanism which in addition to the normal governor beam and a synchronizing spring connected thereto includes means comprising a magnetic link for positively holding the governing mechanism in a fixed position with a predetermined force and permitting movement of the governing mechanism only after such force is overcome as, for example, by a certain percentage of speed change.

For a better understanding of what I believe to be novel and my invention, attention is directed to the following description and the claims appended thereto in connection with the accompanying drawing.

In the drawing the single figure illustrates a prime mover governing mechanism embodying my invention.

The arrangement comprises a prime mover, in the present instance an elastic fluid turbine 10, with an inlet valve 11 for controlling the flow of elastic fluid thereto. The turbine is arranged to drive an electric generator 12 connected to a power line 13. The valve 11 may be controlled in response to speed changes of the turbine 10 by means of a governing mechanism which includes a speed governor 14 driven from the turbine shaft and having flyweights pivotally connected to an intermediate point of a governor beam 15 supported on a fulcrum 16 and biased by a synchronizing spring 17 adjustable by means of a handwheel 18. The right-hand portion of the beam 15 is connected by a link 19 to the right-hand end of a floating follow-up lever 20. An intermediate point of the lever 20 is connected to a pilot valve 21 and the left-hand end of the lever 20 is connected to a stem 22 of a servo motor 23 having a piston 24 secured to the stem 22. An extension of the stem 22 is fastened to the turbine inlet valve 11. The mechanism so far described is well known in the art and typical for controlling elastic fluid turbine admission valves in response to changes of an operating condition, in the present instance the speed of the turbine.

During operation an increase in speed due to decreased load demand from the turbine causes outward movement of the weights of the governor whereby the beam 15 is turned clockwise about the fulcrum 16, thus causing downward movement of the heads of the pilot valve 21 to admit operating fluid under pressure to the lower face of the piston 24 of the hydraulic motor 23, resulting in upward movement of the piston 24 and closing movement of the valve 11 to reduce the admission of elastic fluid to the turbine. Upward movement of the piston 24 through the follow-up lever 20 causes upward movement of the valve heads of the pilot valve 21 whereby the latter are restored to their original line-in-line position. Similarly, a decrease in speed due to increased load demand causes movement of the various elements in a direction opposite to the one just described to effect opening of the valve 11.

The load on the turbine may be set in known manner for a given speed by adjusting the tension of the synchronizing spring 17. With a governing mechanism of this kind any speed change will result in positioning of the turbine inlet valve and a change in load output of the turbine.

According to the invention an improved load-limiting magnetic pullout device 25 is cooperatively associated with the right-hand end portion of the governor beam 15 for fixing any load within the capacity of the turbine and maintaining it constant within a certain speed range of the turbine, or, from another viewpoint, as long as the frequency change in the line 13 remains within certain limits above and below normal frequency.

The device 25 comprises two spaced rods, links or like members 26 and 27. The first or upper link 26 has an upper end pivotally connected to the right-hand end of the governor beam 15 and a lower end carrying a disk or a shoe 28 of magnetic material. The second or lower link 27 is arranged in alignment with the link 26 and near its upper end carries a disk or shoe 29 of magnetic material. The shoes 28 and 29 are securely fastened to the links 26 and 27 respectively. An intermediate portion of the link or rod 27 engages a guide or fixed support 30 and may be forced against such guide or support 30 by means of a brakeshoe 31 engaging the link 27 opposite the guide 30 and yieldingly forced against the link 27 by means including a spring 32 and a reversible electric motor 33 having an electric circuit 34 with a reversing switch 35. The motor has a shaft connected by a worm gear 36 to a threaded rod 37 for varying the compression of the spring 32. Any suitable mechanism may be used for holding the rod 27 in any desired position. The spaced disks or members of magnetic material 28, 29 are connected by a permanent magnetic link 38 which in the present example is in the form of a cylindrical body which has a detachable top or shoe 39 to permit insertion of the disk 28. This top 39 has a central bore 40 through which the link 27 passes. The bottom of the cylinder is integral with the cylinder wall and has a central opening 41 for receiving the upper end of the lower link or rod 27. Shims 42 and 43 of non-magnetic material are inserted between the adjacent faces of the magnetic link 38 and the disk members 29 and 28 respectively. These shims prevent sticking and in addition they contribute an adjustable means for changing the magnetic pull by varying their numbers or thickness to cause variation of the force or pull with which the magnet is attached to the disks 28 and 29 respectively.

Thus, the device 25 so far described comprises means preferably in the form of a permanent magnet for positively holding the governor beam 15 with a predetermined force. The governor beam 15 in the drawing is prevented from clockwise turning movement about the fulcrum 16 by the force or magnetic pull between the disk 28 and the top 39, and the governor lever 15 is prevented from counterclockwise movement by the force or magnetic pull between the bottom of the magnet 38 and the disk member 29.

Let us assume that the turbine 10 is a 10,000 kw. turbine and that the normal frequency in the line is 60 cycles and that it is desired to operate the turbine with a load output of 5,000 kw. and to permit change of such load output only after the frequency in line 13 has changed, that is, increased or decreased one per cent or .6 cycle, or what amounts to the same, that the turbine speed has changed one per cent from normal. The adjustment of the governing mechanism is as follows: The brakeshoe 31 is released or disengaged by properly closing the reversing switch 35 so that the right-hand end of the governor beam 15 with the links 26, 27, 38 is free to move up and down. Thereupon the synchronizing spring 17 is adjusted by turning the handwheel 18 until the load output of the turbine 10 is 5,000 kw. at normal frequency of 60 cycles. Thereupon the reversing switch 35 is temporarily closed to apply the brakeshoe 31 to the rod 27 and to hold the latter in fixed position. The non-magnetic shims 42 and 43 are chosen so as to create a magnetic pull between the corresponding disks 28, 29 and the magnet 38 which is equal to the force of the governor spring measured at the right-hand end of the lever 15 for a frequency change of .6 cycle. With such adjustment the governor beam 15 is held in fixed position until the frequency change exceeds .6 cycle. In other words, a frequency change of less than .6 cycle or a turbine speed change of less than one per cent of the normal turbine speed does not cause movement of the governor beam 15 from its fixed position. If, however, the frequency and accordingly the speed of the turbine increases more than one per cent of the normal frequency, the flyweights of the governor 14 exert a force on the beam 15 which is greater than the magnetic pull between the disk 28 and the top 39, thus forcing the disk 28 downward away from the top 39, breaking the magnetic link and causing downward movement of the heads of the pilot valve 21 to admit operating fluid to the lower face of the piston 24, resulting in upward movement of the latter and closing of the valve 11. Likewise, upon decrease of the speed or the frequency of more than one per cent of the normal speed or frequency respectively, the right-hand end of the beam 15 is forced upward by action of the governor 14 with a force greater than the pull between the disk member 29 and the bottom of the magnet 38, causing a break of the magnetic linkage and upward movement of the pilot valve 20 to admit operating fluid to the upper face of the piston 24, resulting in downward movement of the latter and opening of the inlet valve 11. If now a further increase in speed takes place, the mechanism continues to operate as if the load-setting and load-limiting device 25 were not present. If, however, the load demand should drop again to the set load of 5,000 kw. the magnetic link between the disks 28 and 29 is reestablished. In other words, the mechanism once set for a certain load will hold such load within fixed speed limits. After the mechanism is temporarily rendered inoperative, due to a predetermined speed change, it will automatically reset itself as the speed returns to the set range.

If it is desired to change the load setting, for example, from 5,000 to 8,000 kw., the brakeshoe 31 is disengaged to permit free movement of the right-hand end of the lever 15. Thereupon the synchronizing spring 17 is adjusted until the turbine carries 8,000 kw. at normal frequency of 60 cycles and finally the brakeshoe 31 is applied again to fix the position of the link 27. In certain cases it may be desirable to set or to maintain constant load within a speed range of plus one per cent and minus one half per cent or within a frequency range of plus .6 cycle and minus .3 cycle. This may be readily accomplished with the above mechanism by properly choosing the thickness or the number of shims 42 and 43 respectively.

The magnetic link may be released or rendered inoperative by closing of the reversing switch 35 to release the brake shoe 31 from the link member 27. This might cause a sudden load change. To avoid such sudden change the movement of the lower link member 27 upon release of the brakeshoe 31 is restrained by means of a dashpot arrangement 44 comprising a cylinder 45 with a piston 46 movably disposed therein and secured to an extension of the link 27. The cylinder is filled with fluid, preferably oil, and its upper and lower ends are connected by two bypasses 47 and 48, each including a valve 49 and 50 respectively. The valve 49 may be manually controlled to vary the restriction through the bypass 47. The valve 50 in the present example is remotely controlled by means including a solenoid 51 having a core connected to the valve 50 and an energizing circuit 52 with a push button 53 which latter in a power station may be located on a switchboard. Upon closing of the push button 53 the valve 50 is opened to permit displacement of fluid between the upper and lower ends of the cylinder 45. The synchronizing means 17, 18 for adjusting the load on the prime mover has been diagrammatically shown in the drawing as including a handwheel 18 to permit manual adjustment thereof. In actual practice it is customary to provide for remote control by means including a reversible motor similar to the motor 33 for the brake 31, 32 with a reversing switch located on a switchboard. Such arrangement together with the remote control means including a push button 53 for the dashpot arrangement 44 permits remote setting of the governing mechanism.

Thus, with my invention I have accomplished an improved construction and arrangement of governing mechanisms whereby a variable operating condition such as the load of a prime mover may be readily adjusted and fixed to remain constant within a predetermined adjustable range of such operating condition. My invention comprises a device for rendering a governor or control mechanism inoperative within a predetermined adjustable part of its operating range. In the example described above a speed governing mechanism is rendered inoperative within a certain speed range in order to maintain a load output of a prime mover fixed within such speed range. The governing mechanism broadly includes a speed governor connected to a beam, a synchronizing means for adjusting the governor beam to fix the load output of a prime mover for a certain speed and finally a device independent of such synchronizing means for holding the governor beam, that is, restraining turning movement thereof in either direction with a predetermined adjustable force. The independence of said device from the synchronizing means is important because it facilitates considerably the setting of the governing mechanism and the device itself. Once the synchronizing means is set in the above example to fix the load output of the turbine for a certain speed, all that is necessary then is to lock the device 25 by applying the brake 31. Once this is done no further setting of the synchronizing means is needed. Adjustment of the device 25 is necessary whenever it becomes desirable to vary the range of operation within which the governing mechanism is to be rendered inoperative. This, as explained above, is done by changing the thickness of the non-metallic disks 42 and 43. The device 25 itself in the above example includes a first link 26, a second link 27, and a third link 38 in the form of a permanent magnet for releasably connecting the first and second links. The second link 27 broadly constitutes a releasable adjustable support normally held in fixed position by a locking mechanism such as the guide and brake means 30, 31. A dashpot or like means is attached to the second link to retard movement thereof upon release of the releasable adjustment support in order to prevent sudden load changes of the turbine and consequent hunting of the governing mechanism. The two links 26 and 27, more particularly the disk members 28, 29, attached to the respective links engage separate portions of the permanent magnet and it is important to note that said disk members engage the separate portions of the magnet on the same side thereof. In the example described above the disk 28 engages the underside of one portion of the magnet and the disk 29 engages the underside of another portion of the magnet. The first link 26 of the magnetic pullout device is subject to forces acting in opposite directions and as these forces exceed certain values the magnetic link is broken either between the disk 29 and the permanent magnet or the disk 28 and the permanent magnet.

Having described the method and operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A magnetic pullout device for governing mechanisms comprising a first link, a disk of magnetic material secured to one end thereof, another disk of magnetic material spaced from the first disk, releasable adjustable means for rigidly supporting the other disk, means retarding movement of the other disk upon release of the adjustable means, and means magnetically linking said disks to restrain movement of the first mentioned disk in either direction with a predetermined force.

2. A magnetic pullout device for governing mechanism comprising a first link, a first member of magnetic material secured to one end thereof, a second member of magnetic material spaced from the first member, adjustable means for rigidly supporting the second member, and means magnetically linking said first and second members to restrain movement of the first member in either direction with a predetermined force, said magnetic linking means comprising a permanent magnet having a bottom portion facing the upper side of the second disk and a top portion enclosing the first disk with the top portion facing the upper side of the first disk.

3. Magnetic pullout device for governing mechanisms comprising first link means including a member of magnetic material, second link means including a member of magnetic material, a permanent magnet having separate portions engaged on the same side by said members, releasable supporting means for normally fixing the position of the second link means, and dashpot means associated with the second link means to retard movement thereof upon release of said supporting means.

LINN A. GORE.